US012711948B2

(12) United States Patent
Kim et al.

(10) Patent No.: US 12,711,948 B2
(45) Date of Patent: Aug. 18, 2026

(54) EFFICIENT ADAPTATION OF SPOKEN LANGUAGE UNDERSTANDING BASED ON AUTOMATIC SPEECH RECOGNITION USING MULTI-TASK LEARNING

(71) Applicant: Samsung Electronics Co., Ltd., Suwon-si (KR)

(72) Inventors: Euisung Kim, Mountain View, CA (US); Aditya Jajodia, Sunnyvale, CA (US); Cindy Sushen Tseng, Santa Clara, CA (US); Divya Neelagiri, Dublin, CA (US); Taeyeon Ki, Milpitas, CA (US); Vijendra Raj Apsingekar, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 205 days.

(21) Appl. No.: 18/596,406

(22) Filed: Mar. 5, 2024

(65) Prior Publication Data

US 2024/0304179 A1 Sep. 12, 2024

Related U.S. Application Data

(60) Provisional application No. 63/450,481, filed on Mar. 7, 2023.

(51) Int. Cl.
*G10L 15/00* (2013.01)
*G10L 15/06* (2013.01)
*G10L 25/30* (2013.01)

(52) U.S. Cl.
CPC ............ *G10L 15/063* (2013.01); *G10L 25/30* (2013.01)

(58) Field of Classification Search
None
See application file for complete search history.

(56) References Cited

U.S. PATENT DOCUMENTS 10,431,207 B2 10/2019 Angkititrakul et al.
11,222,627 B1 * 1/2022 Qian ...................... G09B 19/06
(Continued)

FOREIGN PATENT DOCUMENTS

CN 114446324 A 5/2022
CN 115713939 A 2/2023
EP 1107229 A2 6/2001

OTHER PUBLICATIONS

Thomas et al.; "Efficient Adapter Transfer of Self-Supervised Speech Models for Automatic Speech Recognition," ICASSP 2022—2022 IEEE International Conference on Acoustics, Speech and Signal Processing (ICASSP), Singapore, Singapore, 2022, pp. 7102-7106, doi: 10.1109/ICASSP43922. (Year: 2022).*
Kim, E., et al., "Efficient Adaptation of Spoken Language Understanding based on End-to-End Automatic Speech Recognition", Proc. Interspeech 2023, 5 pages.
Seo et al., "Integration of Pre-Trained Networks With Continuous Token Interface for End-to-End Spoken Language Understanding," 2022 IEEE International Conference on Acoustics, Speech and Signal Processing (ICASSP), 5 pages.
(Continued)

*Primary Examiner* — Shreyans A Patel

(57) ABSTRACT

A method includes receiving, by an automatic speech recognition (ASR)-based spoken language understanding (SLU) model, an input utterance using an audio input device. The method also includes, for each token of the input utterance, generating, using a shared ASR encoder of the ASR-based SLU model, an acoustic representation of acoustic features of the token (the shared ASR encoder including a first adapter layer); determining, using an ASR decoder of the ASR-based SLU model, a text representation of the token using the acoustic representation and any previous tokens (the ASR decoder including a second adapter layer); combining, using a fusion model of the ASR-based SLU model, the text representation and the acoustic representation to generate a joint representation, and determining, using an SLU decoder of the ASR-based SLU model, a semantic label associated with the token based on the joint representation and any previous semantic labels.

20 Claims, 9 Drawing Sheets

(56) References Cited

U.S. PATENT DOCUMENTS

| | | | |
|---|---|---|---|
| 11,315,548 | B1 | 4/2022 | Heikinheimo et al. |
| 11,437,026 | B1 * | 9/2022 | Roshan Ghias ........ G10L 15/22 |
| 11,488,586 | B1 | 11/2022 | Tao et al. |
| 11,562,735 | B1 * | 1/2023 | Gupta ................. G10L 15/1822 |
| 2019/0043497 | A1 | 2/2019 | Georges |
| 2021/0312906 | A1 * | 10/2021 | Kuo ..................... G06N 3/0442 |
| 2022/0084508 | A1 * | 3/2022 | Kuo ........................ G10L 15/02 |
| 2022/0108688 | A1 * | 4/2022 | Wang ....................... G06N 3/04 |
| 2022/0310062 | A1 | 9/2022 | Sainath et al. |
| 2023/0081306 | A1 | 3/2023 | Kuo et al. |
| 2024/0304179 | A1 * | 9/2024 | Kim .................... G10L 15/1815 |

OTHER PUBLICATIONS

Zhang et al., "Improving the fusion of acoustic and text representations in RNN-T," Jan. 2022, 5 pages.

Radfar et al., "FANS: Fusing ASR and NLU for on-device SLU," Interspeech 2021, 5 pages.

Supplementary European Search Report dated Jun. 16, 2025, in connection with European Patent Application No. 24766609.2, 5 pages.

International Search Report and Written Opinion of the International Searching Authority dated Jun. 12, 2024, in connection with International Application No. PCT/IB2024/052189, 7 pages.

* cited by examiner

EFFICIENT ADAPTATION OF SPOKEN LANGUAGE UNDERSTANDING BASED ON AUTOMATIC SPEECH RECOGNITION USING MULTI-TASK LEARNING

CROSS-REFERENCE TO RELATED APPLICATION AND PRIORITY CLAIM

This application claims priority under 35 U.S.C. § 119(e) to U.S. Provisional Patent Application No. 63/450,481 filed on Mar. 7, 2023, which is hereby incorporated by reference in its entirety.

TECHNICAL FIELD

This disclosure relates generally to machine learning systems and processes. More specifically, this disclosure relates to efficient adaptation of spoken language understanding based on automatic speech recognition using multi-task learning.

BACKGROUND

Spoken Language Understanding (SLU) enables the determination of intent and extraction of slot information from spoken language. Traditional SLU systems utilize a cascaded approach, which involves combining Automatic Speech Recognition (ASR) and Natural Language Understanding (NLU) in a sequential manner. ASR generates textual transcripts from users' spoken commands, while NLU extracts semantic information from the transcripts.

SUMMARY

This disclosure relates to efficient adaptation of spoken language understanding based on automatic speech recognition using multi-task learning.

In a first embodiment, a method includes receiving, by an automatic speech recognition (ASR)-based spoken language understanding (SLU) model, an input utterance using an audio input device. The method also includes, for each token of the input utterance, generating, using a shared ASR encoder of the ASR-based SLU model, an acoustic representation of acoustic features of the token, where the shared ASR encoder includes a first adapter layer with fine-tuned parameters. The method further includes, for each token of the input utterance, determining, using an ASR decoder of the ASR-based SLU model, a text representation of the token using the acoustic representation and any previous tokens in the input utterance, where the ASR decoder includes a second adapter layer with fine-tuned parameters. The method also includes, for each token of the input utterance, combining, using a fusion model of the ASR-based SLU model, the text representation and the acoustic representation to generate a joint representation. The method further includes, for each token of the input utterance, determining, using an SLU decoder of the ASR-based SLU model, a semantic label associated with the token based on the joint representation and any previous semantic labels. In addition, the method includes performing an action based on the determined semantic labels in the input utterance.

In a second embodiment, an electronic device includes at least one processing device configured to receive, by an ASR-based SLU model, an input utterance using an audio input device. The at least one processing device is also configured, for each token of the input utterance, to generate, using a shared ASR encoder of the ASR-based SLU model, an acoustic representation of acoustic features of the token, where the shared ASR encoder includes a first adapter layer with fine-tuned parameters. The at least one processing device is further configured, for each token of the input utterance, to determine, using an ASR decoder of the ASR-based SLU model, a text representation of the token using the acoustic representation and any previous tokens in the input utterance, where the ASR decoder includes a second adapter layer with fine-tuned parameters. The at least one processing device is also configured, for each token of the input utterance, to combine, using a fusion model of the ASR-based SLU model, the text representation and the acoustic representation to generate a joint representation. The at least one processing device is further configured, for each token of the input utterance, to determine, using an SLU decoder of the ASR-based SLU model, a semantic label associated with the token based on the joint representation and any previous semantic labels. In addition, the at least one processing device is configured to perform an action based on the determined semantic labels in the input utterance.

In a third embodiment, a non-transitory machine readable medium contains instructions that when executed cause at least one processor of an electronic device to receive, by an ASR-based SLU model, an input utterance using an audio input device. The non-transitory machine-readable medium also contains instructions that when executed cause the at least one processor, for each token of the input utterance, to generate, using a shared ASR encoder of the ASR-based SLU model, an acoustic representation of acoustic features of the token, where the shared ASR encoder includes a first adapter layer with fine-tuned parameters. The non-transitory machine-readable medium further contains instructions that when executed cause the at least one processor, for each token of the input utterance, to determine, using an ASR decoder of the ASR-based SLU model, a text representation of the token using the acoustic representation and any previous tokens in the input utterance, where the ASR decoder includes a second adapter layer with fine-tuned parameters. The non-transitory machine-readable medium also contains instructions that when executed cause the at least one processor, for each token of the input utterance, to combine, using a fusion model of the ASR-based SLU model, the text representation and the acoustic representation to generate a joint representation. The non-transitory machine-readable medium further contains instructions that when executed cause the at least one processor, for each token of the input utterance, to determine, using an SLU decoder of the ASR-based SLU model, a semantic label associated with the token based on the joint representation and any previous semantic labels. In addition, the non-transitory machine-readable medium contains instructions that when executed cause the at least one processor to perform an action based on the determined semantic labels in the input utterance.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
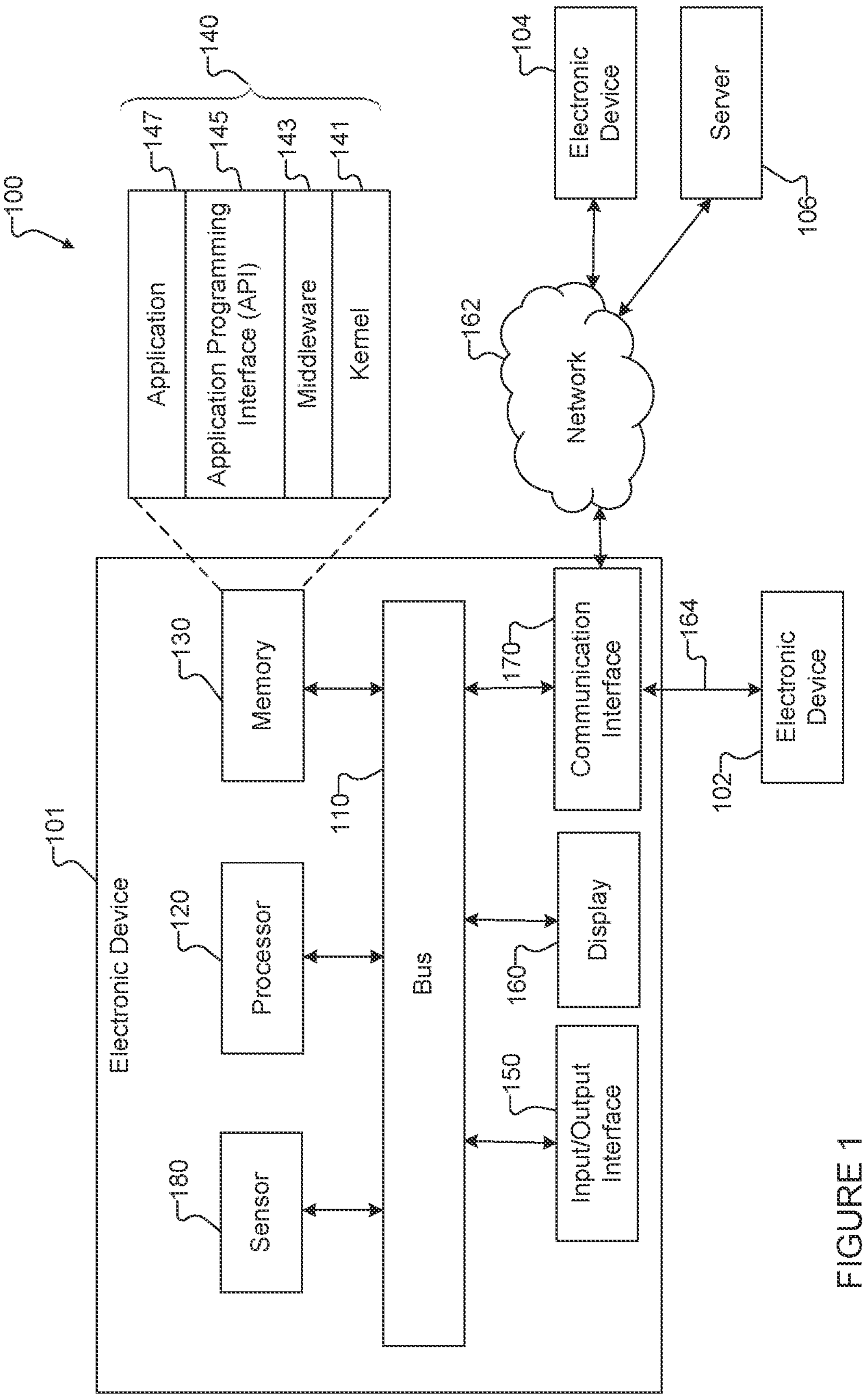
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, Spoken Language Understanding (SLU) enables the determination of intent and extraction of slot information from spoken language. Traditional SLU systems utilize a cascaded approach, which involves combining Automatic Speech Recognition (ASR) and Natural Language Understanding (NLU) in a sequential manner. ASR generates textual transcripts from users' spoken commands, while NLU extracts semantic information from the transcripts.

Although some end-to-end (E2E) SLU approaches have been explored, existing E2E SLU systems exhibit suboptimal performance when compared to traditional cascaded ASR and NLU systems. E2E SLU systems are often treated as a black box with an audio-to-semantics mapper that lacks the capability to output ASR transcripts. Transcripts are typically useful for many speech-based applications to give better user experiences and valuable insights. Also, ensuring that an E2E SLU model remains relevant and effective often requires frequent updates to account for real-world events, popular phrases, or domain-specific information. The need to train and update the entire model, including the ASR component, for every minor change results in highly inefficient processes. Further, E2E SLU systems may struggle to adapt to new domains or rapidly changing environments, potentially limiting their versatility in real-world applications. In addition, E2E SLU systems often demand substantial computational resources to update the entire neural network model with large volumes of audio-semantic pair data, which can be highly resource-intensive.

In order to develop a more effective and proactive system, such as a wake-up-free conversational artificial intelligence (AI) system, this disclosure provides an improved E2E SLU approach. This E2E SLU approach directly predicts semantic information from speech commands, instead of merely combining separate ASR and NLU systems, enabling improved semantic prediction using acoustic information from audio signals. The E2E SLU systems and methods of this disclosure also utilize an adaptation method for E2E SLU, enhancing performance in the target domain efficiently.

The SLU systems and methods of this disclosure provide for efficient adaptation of E2E SLU using an ASR-based E2E SLU model that can increase intent classification and slot filling performance on a specific domain through an efficient learning method by changing the amount of learning parameters of a pre-trained model through an adaptation technique based on the pre-trained ASR. This disclosure also provides a fusion model in the E2E SLU system to incorporate both acoustic embeddings from an encoder component and text embeddings from an ASR decoder in order to enhance the performance of intent and slot prediction. This disclosure further provides an adapter model in the E2E SLU system to efficiently adapt models based on a pre-trained E2E ASR model. In various embodiments, the adapter model is inserted in the E2E SLU model, which allows the pre-trained ASR model to be extended for a specific command domain to predict ASR transcripts as well as to provide corresponding intent and slot predictions. This avoids the inefficiency of training the entire E2E ASR and SLU model from scratch every time there is a minor change.

Among other uses, the ASR-based E2E SLU model of this disclosure can be used in wake-up-less systems. Traditional voice assistants require a wake-up word or phrase to start listening. The ASR-based E2E SLU model of this disclosure allows for systems to always listen and understand contextual conversations without needing a specific wake-up command. This leads to more fluid and natural interactions between users and devices. The ASR-based E2E SLU model of this disclosure can also enhance systems where a conversation does not end after one command or query. Instead, users can have extended dialogues with an assistant, where the system retains context throughout the conversation. For example, after asking about the weather in Seoul, a user could follow up with "How about Mountain View, California?" without repeating the full context. The ASR-based E2E SLU model of this disclosure thus provides various advantages, such as bridging the gap between automatic speech recognition and natural language understanding, making voice interactions more seamless and intuitive.

Note that while some of the embodiments discussed below are described in the context of use in consumer electronic devices (such as smartphones), this is merely one example. It will be understood that the principles of this disclosure may be implemented in any number of other suitable contexts and may use any suitable device or devices. Also note that while some of the embodiments discussed below are described based on the assumption that one device (such as a server) performs training of a machine learning model that is deployed to one or more other devices (such as one or more consumer electronic devices), this is also merely one example. It will be understood that the principles of this disclosure may be implemented using any number of devices, including a single device that both trains and uses a machine learning model. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform various operations related to automated speech recognition and spoken language understanding. For example, as described below, the processor 120 may receive and process inputs (such as audio inputs or data received from an audio input device like a microphone) and perform automated speech recognition and spoken language understanding tasks using the inputs. The processor 120 may also instruct other devices to perform certain operations (such as outputting audio using an audio output device like a speaker) or display content on one or more displays 160. The processor 120 may further receive inputs (such as data samples to be used in training machine learning models) and manage such training by inputting the samples to the machine learning models, receive outputs from the machine learning models, and execute learning functions (such as loss functions) to improve the machine learning models.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support various functions related to automated speech recognition and spoken language understanding. For example, the application 147 can include one or more applications supporting the receipt of audio data, recognizing words or utterances included in the audio data, generating acoustic representations of tokens of the input audio data, determining text representations of tokens of the input audio data, combining the text representation and the acoustic representation to generate a joint representation, determining a semantic label associated with the token based on the joint representation and any previous semantic labels, and executing tasks or performing actions related to the content of the utterances and based on the determined semantic labels in the input utterance. These functions can be performed by a single application or by multiple applications that each carries out one or more of these functions.

The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform various operations related to automated speech recognition and spoken language understanding. For example, as described below, the server 106 may receive and process inputs (such as audio inputs or data received from an audio input device like a microphone) and perform automated speech recognition and spoken language understanding tasks using the inputs. The server 106 may also instruct other devices to perform certain operations (such as outputting audio using an audio output device like a speaker) or display content on one or more displays 160. The server 106 may further receive inputs (such as data samples to be used in training machine learning models) and manage such training by inputting the samples to the machine learning models, receive outputs from the machine learning models, and execute learning functions (such as loss functions) to improve the machine learning models.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
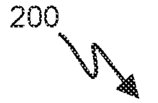
FIG. 2 illustrates an example automated speech recognition (ASR)-based spoken language understanding (SLU) system in accordance with this disclosure.
Figure 2:
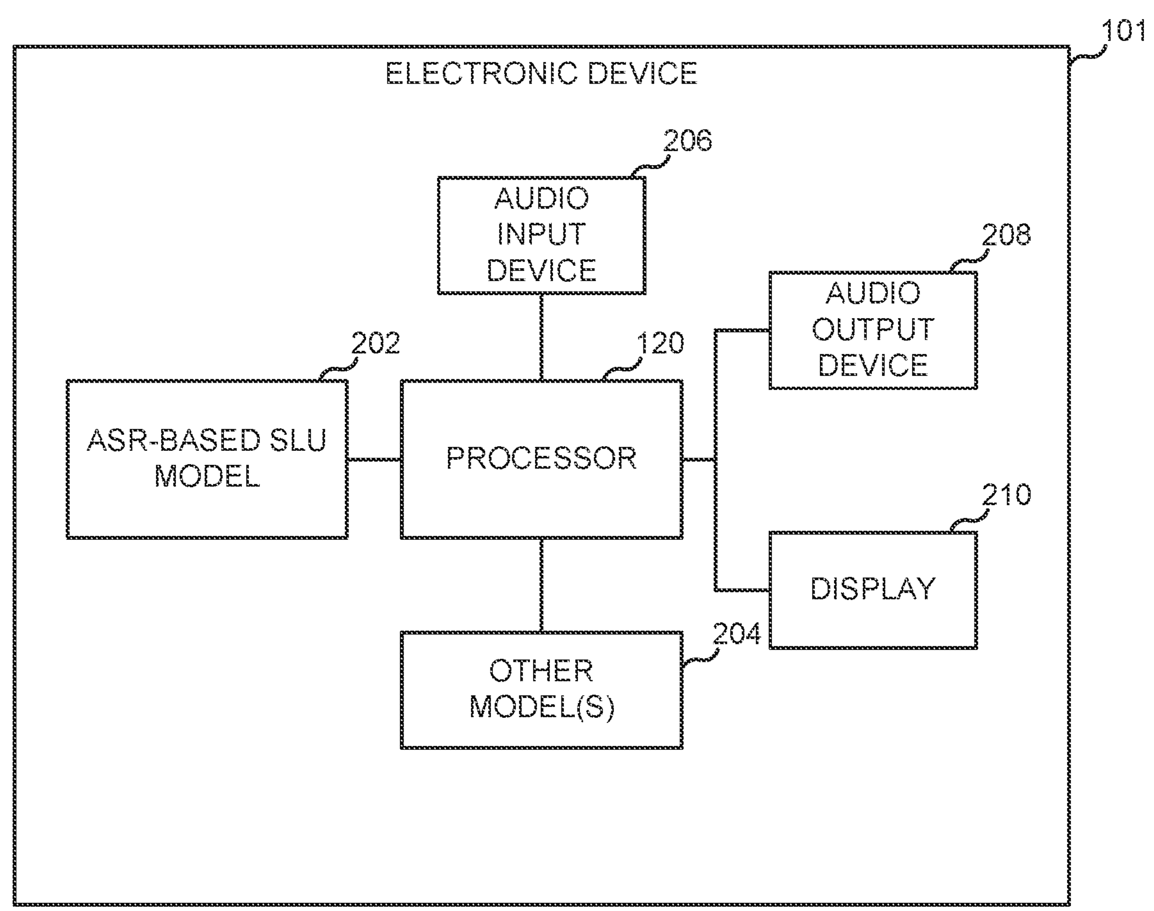

FIG. 2 illustrates an example ASR-based SLU system 200 in accordance with this disclosure. For case of explanation, the system 200 is described as involving the use of the electronic device 101 in the network configuration 100 of FIG. 1. However, the system 200 may be used with any other suitable device (such as the server 106) or a combination of devices (such as the electronic device 101 and the server 106) and in any other suitable system(s).

As shown in FIG. 2, the system 200 includes the electronic device 101, which includes the processor 120. The processor 120 is operatively coupled to or otherwise configured to use one or more machine learning models, such as an ASR-based SLU model 202. As further described in this disclosure, the ASR-based SLU model 202 can include various components and sub-models, such as a shared ASR encoder, an ASR decoder, a fusion model, and an SLU decoder. The ASR-based SLU model 202 can be trained to recognize words or utterances included in received audio data, generate acoustic representations of tokens of the input audio data, determine text representations of tokens of the input audio data, combine the text representation and the acoustic representation to generate a joint representation, and determine a semantic label associated with the token based on the joint representation and any previous semantic labels. Based on the semantic labels, the processor 120 can instruct device execution or performance of tasks or actions related to the content of the utterances.

The processor 120 can also be operatively coupled to or otherwise configured to use one or more other models 204, such as other models related to automated speech recognition or voice assistant processes. It will be understood that the machine learning models 202, 204 can be stored in a memory of the electronic device 101 (such as the memory 130) and accessed by the processor 120 to perform automated speech recognition tasks, spoken language understanding tasks, and/or other tasks. However, the machine learning models 202, 204 can be stored in any other suitable manner.

The system 200 also includes an audio input device 206 (such as a microphone), an audio output device 208 (such as a speaker or headphones), and a display 210 (such as a screen or a monitor like the display 160). The processor 120 receives an audio input from the audio input device 206 and provides the audio input to the trained ASR-based SLU model 202. The trained ASR-based SLU model 202 processes the audio input and outputs a result to the processor 120, such as one or more slot-filled data structures and/or intents associated with the audio input. The processor 120 may instruct one or more further actions that correspond to one or more instructions or requests provided in the utterance.

As a particular example, assume an utterance is received from a user via the audio input device 206 including a command (such as "call mom"). Here, the trained ASR-based SLU model 202 is used to recognize the command to be performed using both (i) ASR processes to generate acoustic and text representations of the audio input and (ii) SLU processes to generate semantic labels associated with the audio input. Based on the output of the ASR-based SLU model 202, the processor 120 instructs the audio output device 208 to output "calling Mom." The processor 120 also causes a phone application or other communication application to begin a communication session with a "mom" contact stored on the electronic device 101 or otherwise in association with the user of the electronic device 101. As another example, suppose an utterance of "start a timer" is received. The trained ASR-based SLU model 202 may process the utterance and provide an output that the processor 120 uses to instruct execution of a timer application and display of a timer on the display 210 of the electronic device 101.

Although FIG. 2 illustrates one example of an ASR-based SLU system 200, various changes may be made to FIG. 2. For example, in some embodiments, the audio input device 206, the audio output device 208, and the display 210 can be connected to the processor 120 within the electronic device 101, such as via wired connections or circuitry. In other embodiments, the audio input device 206, the audio output device 208, and the display 210 can be external to the electronic device 101 and connected via wired or wireless connections. Also, in some cases, the ASR-based SLU model 202 and one or more of the other machine learning models 204 can be stored as separate models called upon by the processor 120 to perform certain tasks or can be included in and form a part of one or more larger machine learning models. Further, in some embodiments, one or more of the machine learning models, such as the ASR-based SLU model 202 and/or one or more of the other machine learning models 204, can be stored remotely from the electronic device 101, such as on the server 106. Here, the electronic device 101 can transmit requests including inputs (such as captured audio data) to the server 106 for processing of the inputs using the machine learning models, and the results can be sent back to the electronic device 101. In addition, in some embodiments, the electronic device 101 can be replaced by the server 106, which receives audio inputs from a client device and transmits instructions back to the client device to execute functions associated with instructions included in utterances.

Figure 3:
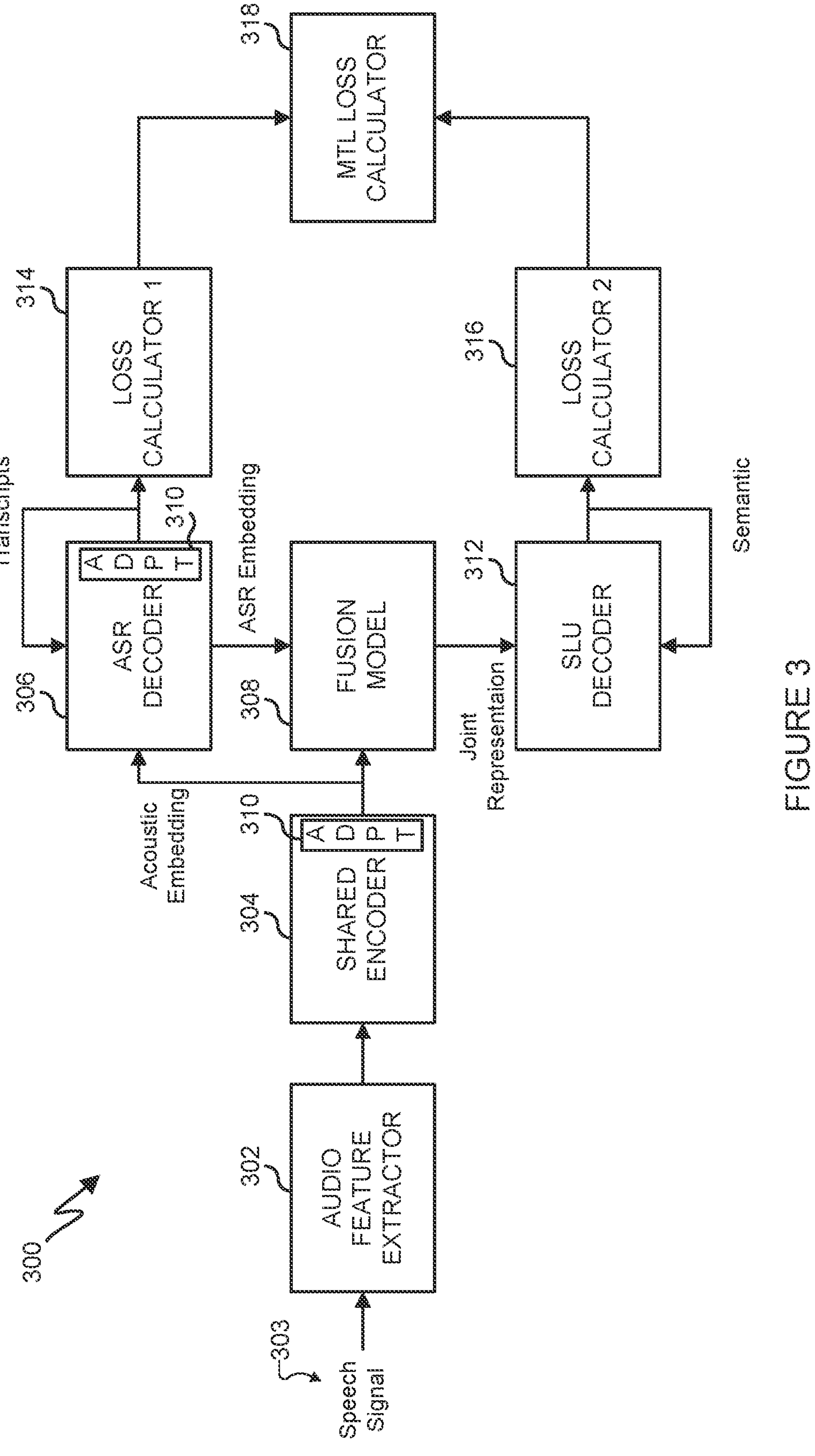
FIG. 3 illustrates an example ASR-based SLU process in accordance with this disclosure.

FIG. 3 illustrates an example ASR-based SLU process 300 in accordance with this disclosure. For case of explanation, the process 300 is described as involving the use of the electronic device 101 in the network configuration 100 of FIG. 1. However, the process 300 may be used with any other suitable device (such as the server 106) or a combination of devices (such as the electronic device 101 and the server 106) and in any other suitable system(s).

As shown in FIG. 3, the process 300 includes an audio feature extractor 302 receiving a speech signal 303. The audio feature extractor 302 processes the speech signal 303 and provides extracted audio features as inputs to a shared encoder 304. The shared encoder 304 generates, using the input extracted audio features, acoustic embeddings or representations associated with the audio input for both an ASR decoder 306 and a fusion model 308. The ASR decoder 306 uses the acoustic embedding to output transcripts or text representations of the audio inputs. The shared encoder 304 and the ASR decoder 306 both include an adapter model 310. The adapter model 310 is used to fine-tune the overall model efficiently with respect to predicting the ASR transcripts and predicting the corresponding intents and slots in arbitrary domains/environments. Specifically, the adapter models 310 are inserted into the E2E SLU model to allow for pre-trained ASR models (such as the ASR decoder 306) to be extended for specific command domains to perform ASR transcript prediction as well as corresponding intent and slot prediction, such as to avoid training the entire ASR and SLU models every time there is a minor change.

As also shown in FIG. 3, the ASR decoder 306 provides an ASR embedding to the fusion model 308. The fusion model 308 thus receives both the acoustic embedding from the shared encoder 304 and the ASR embedding from the ASR decoder 306. The fusion model 308 enhances SLU performance by incorporating acoustic and text information into a combined or joint representation that is used for semantic predictions performed by an SLU decoder 312. The SLU decoder 312 outputs predicted semantic labels that can be used in performing particular tasks or actions associated with the speech signal 303. The shared encoder 304, the ASR decoder 306, the fusion model 308, and the SLU decoder 312 can all be part of an ASR-based SLU model, such as the ASR-based SLU model 202 of FIG. 2. In some embodiments, the audio feature extractor 302 is also a part of the ASR-based SLU model.

In various embodiments, during training of the ASR-based SLU model, the process 300 includes performing multi-task learning using (i) a first loss calculator 314 that determines a first loss using the outputs from the ASR decoder 306 and (ii) a second loss calculator 316 that determines a second loss using the outputs from the SLU decoder 312. For example, the process 300 can use two negative log likelihood functions, one for ASR outputs and another for semantic information (intents and slots) outputs. A combined multi-task loss is determined from the first and second losses using a multi-task loss calculator 318. As described in this disclosure, various training approaches can be taken, such as using the calculated losses to update all components of the ASR-based SLU model, including the shared encoder 304, the ASR decoder 306, the fusion model 308, and the SLU decoder 312. In other embodiments, the training can include updating just the fusion model 308 and the SLU decoder 312. In still other embodiments, the training can include updating just the fusion model 308, the SLU decoder 312, and the adapter models 310, without updating the other parameters of the shared encoder 304 and the ASR decoder 306.

Although FIG. 3 illustrates one example of an ASR-based SLU process 300, various changes may be made to FIG. 3. For example, various components and functions in FIG. 3 may be combined, further subdivided, replicated, or rearranged according to particular needs. Also, one or more additional components and functions may be included if needed or desired. In addition, while shown as involving a series of steps, various steps in FIG. 3 could overlap, occur in parallel, occur in a different order, or occur any number of times (including zero times).

Figure 4:
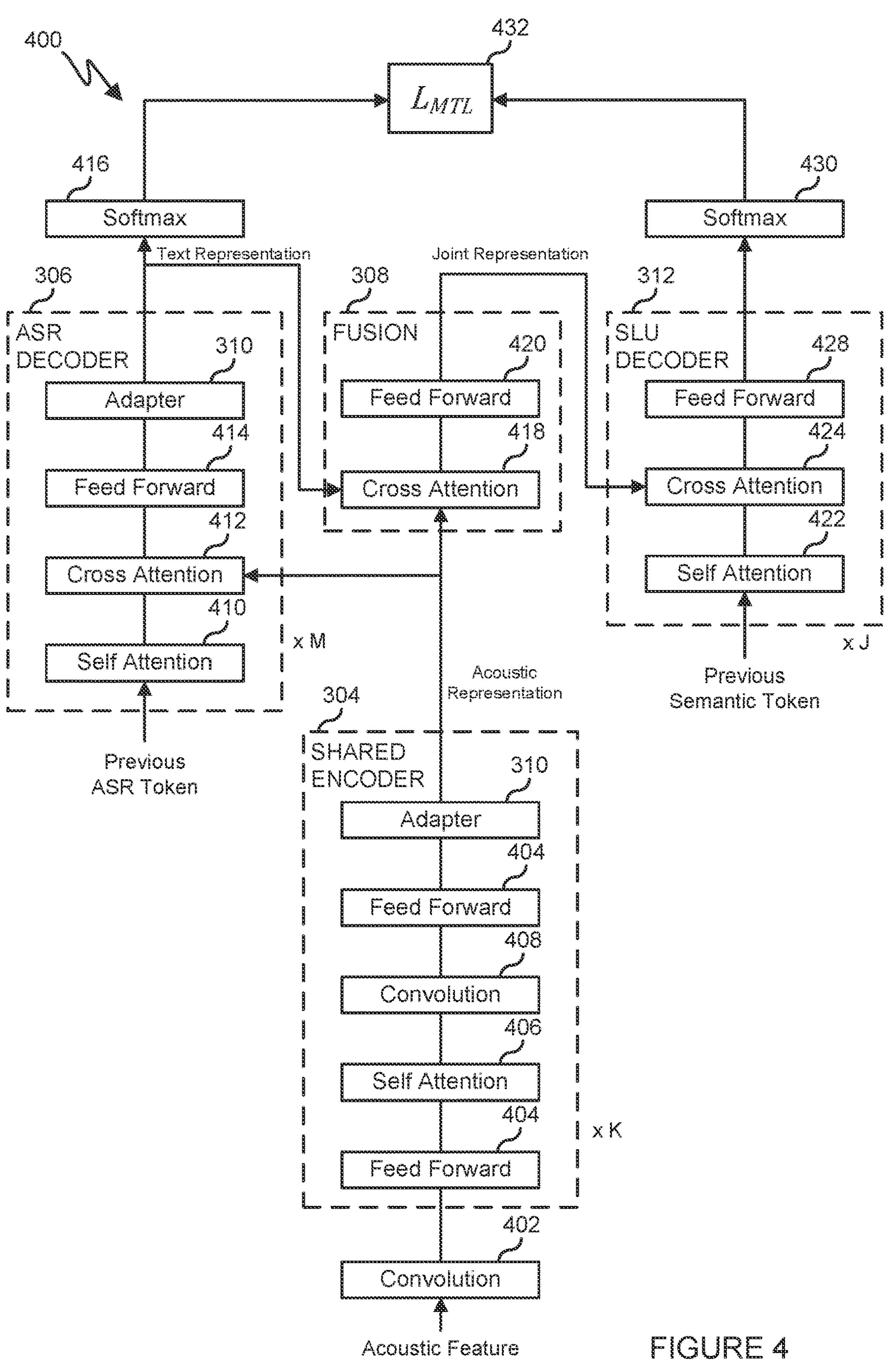
FIG. 4 illustrates an example ASR-based SLU model architecture in accordance with this disclosure.

FIG. 4 illustrates an example ASR-based SLU model architecture 400 in accordance with this disclosure. For case of explanation, the architecture 400 shown in FIG. 4 is described as being implemented on or supported by the electronic device 101 in the network configuration 100 of FIG. 1. However, the architecture 400 shown in FIG. 4 could be used with any other suitable device (such as the server 106) or a combination of devices (such as the electronic device 101 and the server 106) and in any other suitable system(s).

As shown in FIG. 4, the architecture 400 includes an attention encoder-decoder (AED) architecture-based E2E SLU model. In this example, the architecture 400 includes the shared encoder 304, the ASR decoder 306, the fusion model 308, and the SLU decoder 312, such as described with respect to FIG. 3. The shared encoder 304, the ASR decoder 306, and the SLU decoder 312 are used to estimate sequence posterior probabilities for ASR outputs (transcripts) and SLU semantic outputs (intents and slots).

In some embodiments, the shared encoder 304 can be a transformer and a conformer, which is a combination of a convolutional neural network (CNN) and a multi-head self-attention-based transformer. As shown in FIG. 4, the shared encoder 304 can receive extracted acoustic features through a first convolution layer 402. The outputs of the first convolution layer 402 are processed by the shared encoder 304 using one or more feed forward layers 404, one or more self-attention layers 406, and one or more convolution layers 408. As shown in FIG. 4, an adapter model or layer 310 receives and processes outputs from a final feed forward layer 404. In this way, the shared encoder 304 can provide acoustic representations of audio input data by mapping an input filter bank feature sequence $X=(x_1, x_i, \ldots, x_T)$, $x_i \in \mathbb{R}$, to an acoustic representation $$h^{enc} = (h_1^{enc}, \ldots, h_i^{enc}, h_n^{enc}),$$

where $h^{enc} \in \mathbb{R}$, T is the number of acoustic frames and n is the number of the encoder output. In some cases, this can be expressed as follows.

$$h^{enc} = \text{Encoder}_{asr}(X) \tag{1}$$

The acoustic representations are provided to both the ASR decoder 306 and the fusion model 308. In some embodiments, the ASR decoder 306 can be an attention-based ASR decoder. The ASR decoder 306 receives one or more of any previous ASR tokens at a self-attention layer 410. A cross-attention layer 412 receives both the outputs of the self-attention layer 410 and the acoustic representations provided by the shared encoder 304. The outputs of the cross-attention layer 412 are provided to a feed forward or linear layer 414. An adapter layer including the adapter model 310 of the ASR decoder 306 receives outputs from the feed forward layer 414.

The adapter models 310 enhance adaptation on specific domains/environments, improving both transcription prediction and associated semantics. Incorporating the adapter models 310 in the pre-trained ASR encoder 304 and ASR decoder 306 increases effectiveness for semantic and transcript predictions. In various embodiments, the adapter models 310 can be included in each layer of the pre-trained transformer layers, such as after self-attention and position-wise feed forward layers, as shown in FIG. 4. In various embodiments, each adapter model 310 includes a down-projection linear layer to project the input to a lower-dimensional space, followed by a nonlinear activation function and an up-projection linear layer. The adapter models 310 can be surrounded by residual connections.

The ASR decoder 306 predicts text representation $h^{dec}$, conditional on $h^{enc}$ and one or more of any previous subword tokens $$y_{1:u-1}^{asr}.$$

In some cases, this can be expressed as follows.

$$h_u^{dec} = AttentionDecoder_{asr}(h^{enc}, y_{1:u-1}^{asr}) \tag{2}$$

The posterior probability of ASR label $$y_u^{asr}$$

is calculated by applying the linear layer 414 and the adapter layer 310 followed by a softmax function 416. In some cases, this can be expressed as follows.

$$P(y_u^{asr} \mid X, y_{1:u-1}^{asr}) = Softmax(\text{Linear}(h_u^{dec})) \quad (3)$$

In some cases, ASR transcription prediction can be retained while predicting semantics in order to reuse components and make the entire end-to-end SLU speech pipeline more efficient. To accomplish this, the fusion model 308 receives and combines both the acoustic representation $h^{enc}$ from the shared ASR encoder 304 and the text representation $h^{dec}$ from the ASR decoder 306. For example, the fusion model 308 may use a multi-head attention (MHA) approach, such as by receiving the acoustic representation and the text representation at a cross-attention layer 418 of the fusion model 308. The fusion model 308 thus enhances SLU performance by incorporating acoustic and text information for use by the SLU decoder 312. The fusion model 308 combines acoustic embeddings from the shared encoder 304 and transcript embeddings from the ASR decoder 306 with the cross-attention layer 418 followed by feed forward layer 420 to generate a fused or joint embedding for use by the SLU decoder 312. In some embodiments, the cross-attention layer 418 uses acoustic representation $h^{enc}$ as a query and text representation $h^{dec}$ as a key and value. In other embodiments, the text representation $h^{dec}$ can be used as a query, and the acoustic representation $h^{enc}$ can be used as a key and value. The output of the cross-attention layer 418 is fed to the feed forward or linear layer 420 of the fusion model 308, which outputs a joint representation $h^{joint}$. In some cases, the functionality of the fusion model can be expressed as follows.

$$h^{attn} = h^{enc} + MHA(h^{enc}, h^{dec}) \quad (4)$$

$$h^{joint} = \text{Linear}(h^{attn}) \quad (5)$$

In some embodiments, the SLU decoder 312 can be an attention-based SLU decoder. Prior approaches used large pretrained NLU models to predict the intent and slot labels. In contrast, the architecture 400 uses a smaller attention-based decoder for SLU. The joint representation provided by the fusion model 308 is used by the SLU decoder 312 along with any previous SLU (semantic) labels. The previous SLU labels are provided to a self-attention layer 422 of the SLU decoder 312. As shown in FIG. 4, a cross-attention layer 424 of the SLU decoder 312 receives the outputs from the self-attention layer 422, as well as the joint representations provided by the fusion model 308. The SLU decoder 312 predicts intents and slots conditioned on the joint representation $h^{joint}$ and one or more of any previous SLU labels by applying a feed forward or linear layer 428 of the fusion model followed by a softmax function 430. In some cases, this can be expressed as follows.

$$h_v^{slu} = AttentionDecoder_{slu}(h^{joint}, y_{1:v-1}^{slu}) \quad (6)$$

$$P(y_v^{slu} \mid h^{joint}, y_{1:v-1}^{slu}) = Softmax(\text{Linear}(h_v^{slu})) \quad (7)$$

Here, $v \in V$ for all possible intents and slot values.

During inferencing, the outputs of the SLU decoder 312 are used in determining an action to be performed by an electronic device, such as the electronic device 101. During training, a multi-task loss (MTL) function 432 may be used to train the ASR-based SLU model architecture 400. In some embodiments, the MTL function 432 is a weighted sum of the negative log likelihoods from the ASR and SLU tasks. In various embodiments, this MTL approach enables accurate estimation of both transcript and semantic information by jointly optimizing the ASR decoder 306, the SLU decoder 312, and the shared encoder 304. In some cases, the operation of the MTL function 432 can be expressed as follows.

$$L_{MTL} = -(1-\alpha)\sum_u \ln P(y_u^{asr} \mid x, y_{1:u-1}^{asr}) - \alpha \sum_v \ln P(y_v^{slu} \mid x, y_{1:v-1}^{slu}) \quad (8)$$

Here, $\alpha$ is a scaling factor for balancing the ASR loss and the SLU loss. Using the MTL function 432 to jointly train the ASR decoder 306, the SLU decoder 312, and the shared encoder 304 enables the model to estimate transcripts and semantics simultaneously.

Results have shown that the architecture 400 achieves better performance on ASR and SLU tasks than existing models, including a significant reduction in total number of trainable parameters (such as by a factor of 11) and a reduction in total training time (such as by a factor of 1.5) all while maintaining accurate performance.

Referring again to the fusion model 308, the fusion model 308 integrates acoustic and ASR embeddings into a joint representation to improve SLU performance while maintaining ASR performance. Provided below is a description of how this process occurs through three different example variants.

For a streaming ASR model-based SLU model, at each time step t, an audio mel-filter bank frame $X_t$ is processed by the encoder 304 to generate an acoustic embedding denoted as $\text{embed}_{acoustic,t}$. This can be expressed as follows.

$$\text{embed}_{acoustic,t} = \text{Encoder}(X_t) \quad (9)$$

The ASR decoder 306 uses this acoustic embedding $\text{embed}_{acoustic,t}$ to produce the corresponding ASR embedding $\text{embed}_{ASR,t}$. This can be expressed as follows.

$$\text{embed}_{ASR,t} = ASRDecoder(\text{embed}_{acoustic,t}) \quad (10)$$

As each time step proceeds, the ASR embedding $\text{embed}_{ASR,t}$ is first passed through a softmax layer to convert the embedding into a probability distribution over the possible sub-words or tokens and then a decoding algorithm such as beam search or greedy decoding is performed based on the probability distribution to emit one or more words that were spoken during the frame corresponding to the time step. In parallel, both the generated acoustic embeddings $embed_{acoustic,t}$ and the ASR embeddings $embed_{ASR,t}$ are cached in memory. Once the final frame or the end of the utterance is detected, the fusion model 308 generates a joint representation $embed_{fusion,N}$ using the accumulated embeddings as follows:

$$embed_{fusion} = FusionModel(embed_{ASR,1:T}, embed_{acoustic,1:T}) \quad (11)$$

It will be noted that these cumulative embeddings can be cached to ensure immediate access without reprocessing previous frames, thus preserving the contextual history.

For a chunk-based streaming ASR model-based SLU model, in this streaming context, at each time step t, the ASR decoder 306 utilizes a contextual window (also referred to as a "chunk" herein) comprising the current and past n acoustic embeddings. This set can be represented as ($[embed_{acoustic,t-n}, \ldots, embed_{acoustic,t-1}, embed_{acoustic,t}]$). This can further be expressed as follows.

$$embed_{ASR,t} = ASRDecoder([embed_{acoustic,t-n}, \ldots, embed_{acoustic,t-1}, embed_{acoustic,t}]) \quad (12)$$

As each time step proceeds, the ASR embedding $embed_{ASR,t}$ is first passed through a softmax layer to convert the embedding into a probability distribution over the possible sub-words or tokens and then a decoding algorithm such as beam search or greedy decoding is performed based on the probability distribution to emit one or more words that were spoken during the chunk. In parallel, both the generated acoustic embeddings $embed_{acoustic,t}$ and the ASR embeddings $embed_{ASR,t}$ are cached in memory. Once the final chunk or the end of the utterance is detected, the fusion model 308 generates a joint representation $embed_{fusion,N}$ using the accumulated embeddings as follows:

$$embed_{fusion} = FusionModel(embed_{ASR,1:K}, embed_{acoustic,1:K}) \quad (13)$$

Here, K represents the total number of processed chunks.

For a batch ASR model-based SLU model, in batch processing, the entire audio recording of an utterance $X_{1:N}$ (where N is the total number of frames) is processed at once. This can be expressed as follows.

$$embed_{acoustic,1:N} = \text{Encoder}(X_{1:N}) \quad (14)$$

$$embed_{ASR,1:N} = ASRDecoder(embed_{acoustic,1:N}) \quad (15)$$

$$embed_{fusion,N} = FusionModel(embed_{ASR,1:N}, embed_{acoustic,1:N}) \quad (16)$$

After the batch ASR model has processed the entire utterance and generated a sequence of acoustic and ASR embeddings, these acoustic and ASR embeddings are integrated into a joint representation $embed_{fusion,N}$ using the fusion model 308.

Although FIG. 4 illustrates one example of an ASR-based SLU model architecture 400, various changes may be made to FIG. 4. For example, various components and functions in FIG. 4 may be combined, further subdivided, replicated, or rearranged according to particular needs. Also, one or more additional components and functions may be included if needed or desired.

Figure 5:
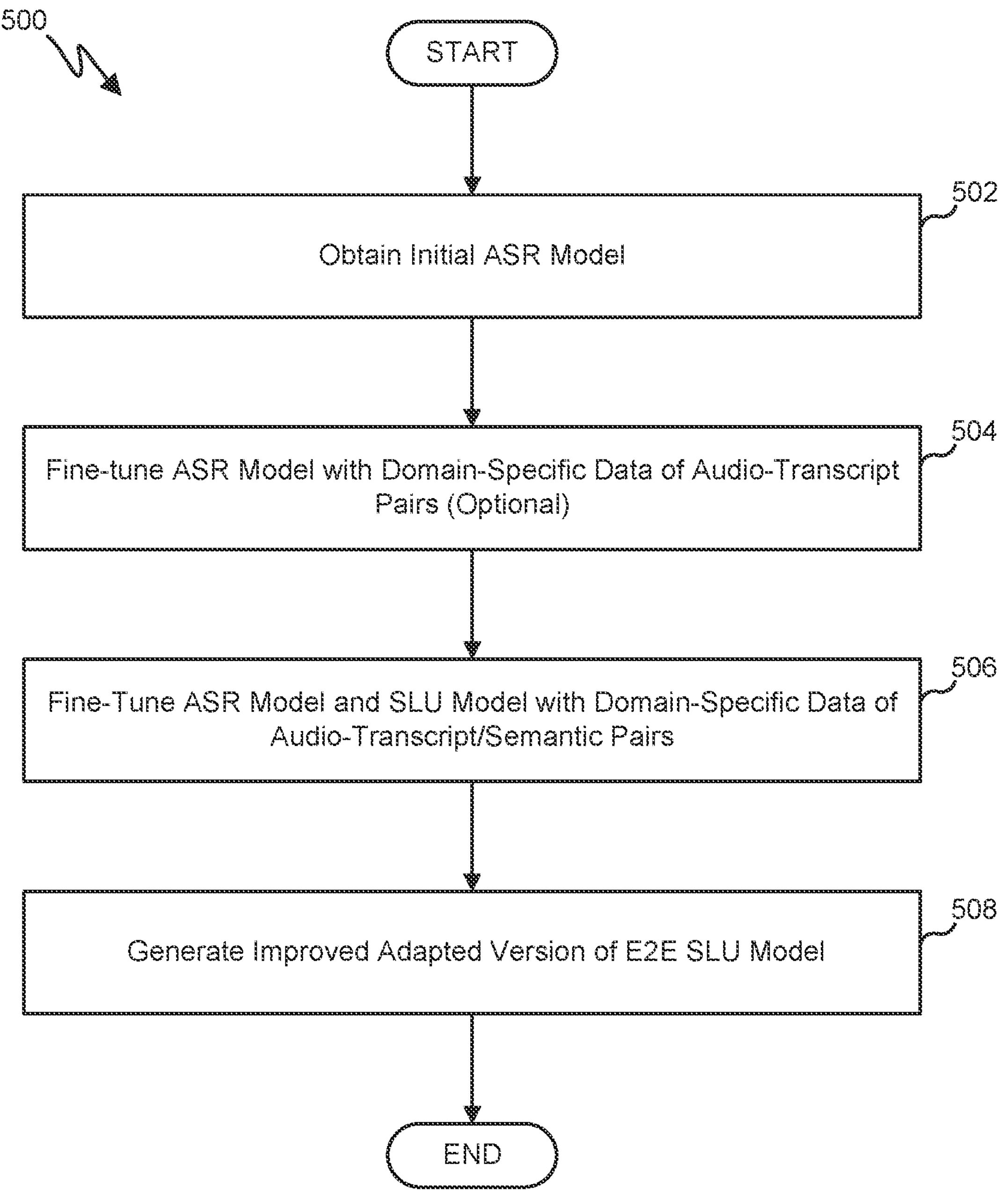
FIG. 5 illustrates an example method for performing domain adaptation of an NLU system in accordance with this disclosure.

FIG. 5 illustrates an example method 500 for performing domain adaptation of an SLU system in accordance with this disclosure. For ease of explanation, the method 500 shown in FIG. 5 is described as being performed using the electronic device 101 in the network configuration 100 of FIG. 1. However, the method 500 could be performed using any other suitable device (such as the server 106) or a combination of devices (such as the electronic device 101 and the server 106) and in any other suitable system(s).

At step 502, an initial ASR model is obtained. This initial ASR model can include an ASR encoder and an ASR decoder and can be at least initially pre-trained using one or more audio-text pair datasets to recognize general speech inputs. At step 504, the initial ASR model is optionally fine-tuned using domain-specific data in the form of audio-transcript pairs to modify the ASR model for a specific domain. In some embodiments, the fine-tuning of the ASR model at step 504 includes training the encoder and the decoder using a negative log loss function similar to the portion of Equation (8) pertaining to the ASR loss. In other embodiments, step 504 may be skipped.

At step 506, the ASR model and an initial SLU model are jointly fine-tuned using domain-specific data including audio-transcript and semantic data pairs. The fine-tuning at step 506 can involve training the shared ASR encoder 304, the ASR decoder 306, the fusion model 308, and the SLU decoder 312 using the multi-task negative log loss function, such as shown in Equation (8). At step 508, a trained and adapted end-to-end ASR-based SLU model is generated for use. In both fine-tuning steps 504 and 506, when the loss is calculated by the loss function, the parameters of the ASR model and/or the SLU model can be adjusted based on an adaptive optimization method which can include an Adam optimizer and learning rate scheduler. Once adjusted, the same or additional training data can be provided to the models, and additional outputs from the models can be compared to the ground truths so that additional losses can be determined using the loss function. Ideally, over time, the models produce more accurate outputs that more closely match the ground truths, and the measured loss becomes less. At some point, this step is stopped when the accuracy on a validation set stops improving.

Although FIG. 5 illustrates one example of a method 500 for performing domain adaptation of an SLU system, various changes may be made to FIG. 5. For example, while shown as a series of steps, various steps in FIG. 5 could overlap, occur in parallel, occur in a different order, or occur any number of times (including zero times).

Figure 6:
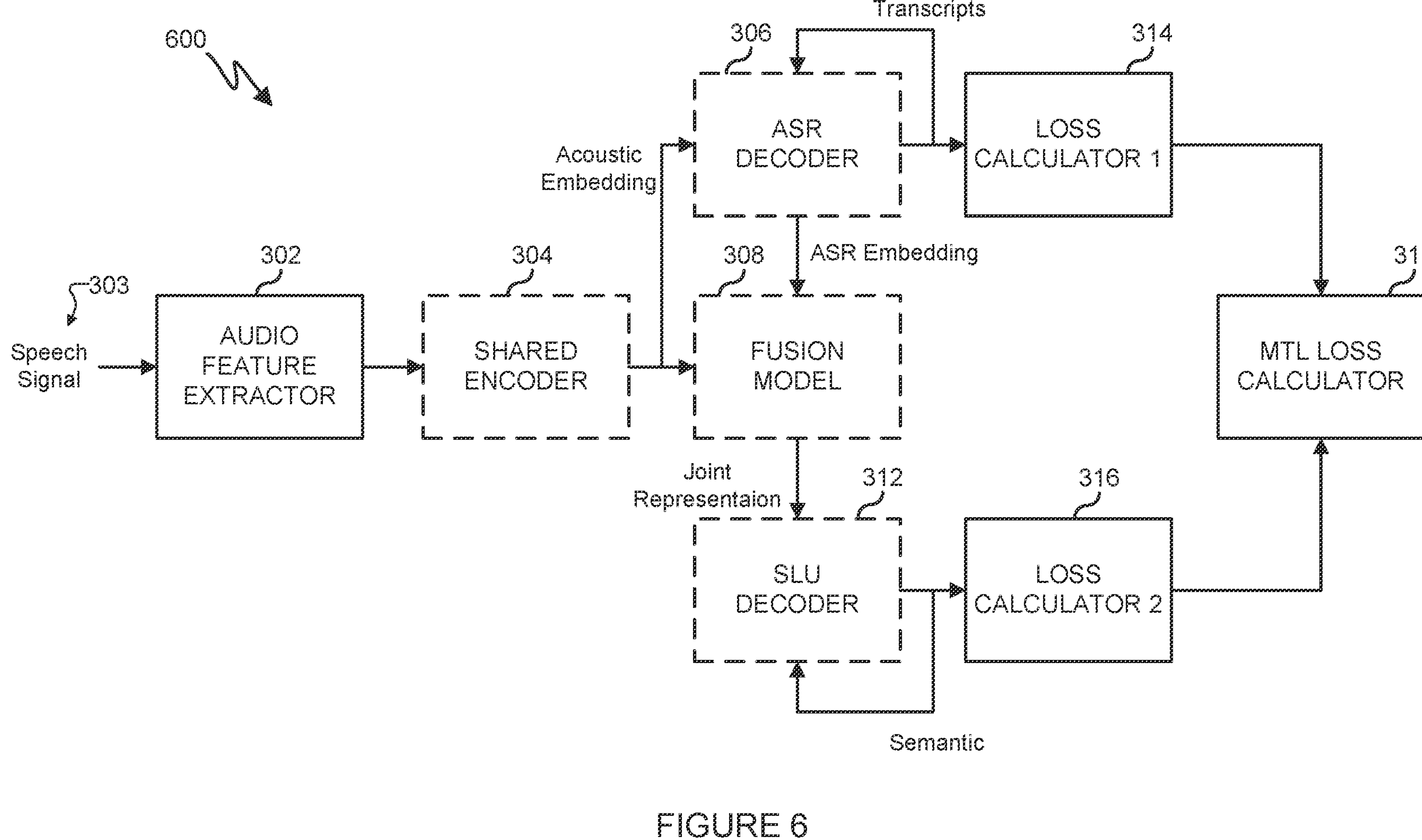
FIGS. 6 through 8 illustrate example ASR-based SLU model training processes in accordance with this disclosure.
Figure 7:
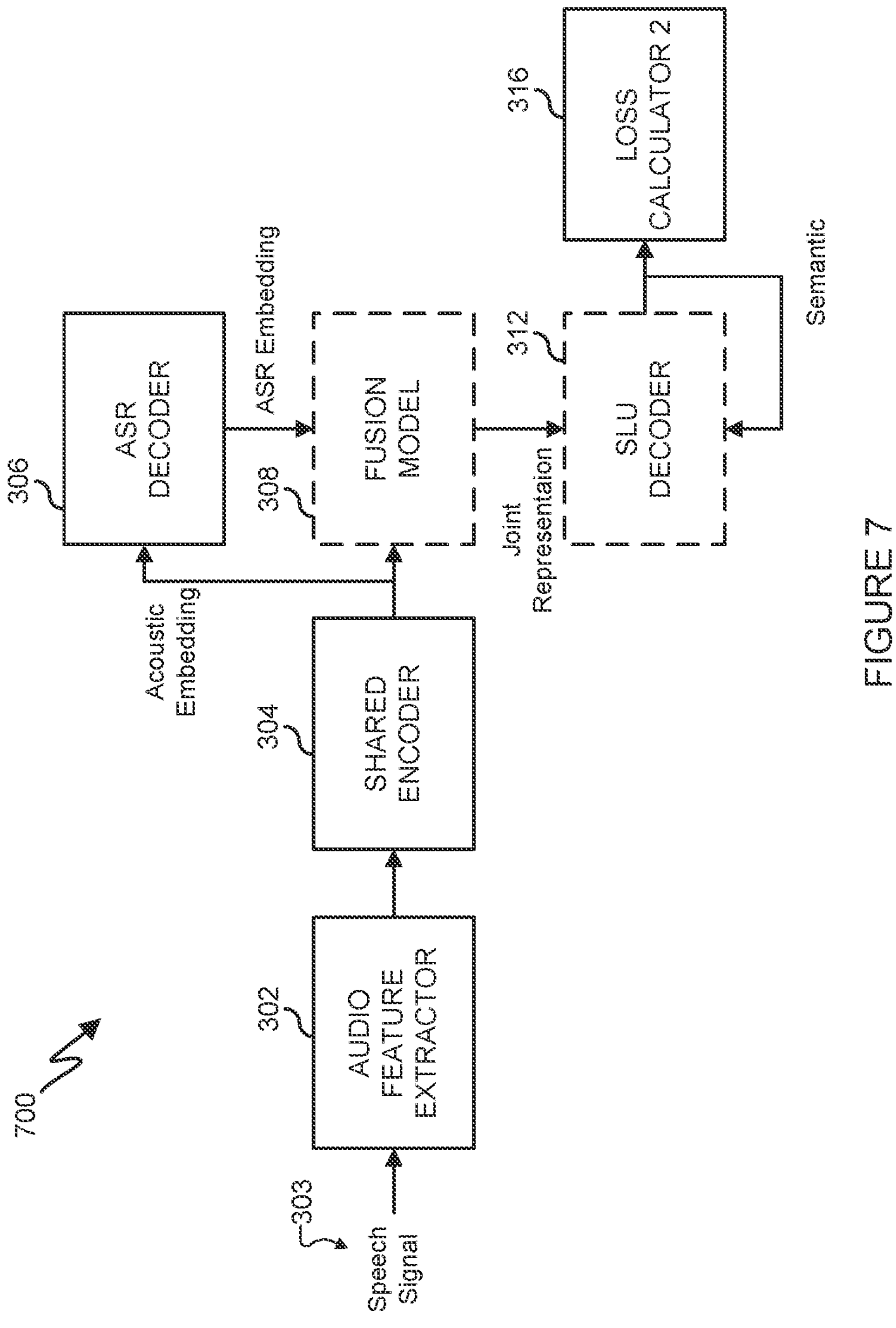
Figure 8:
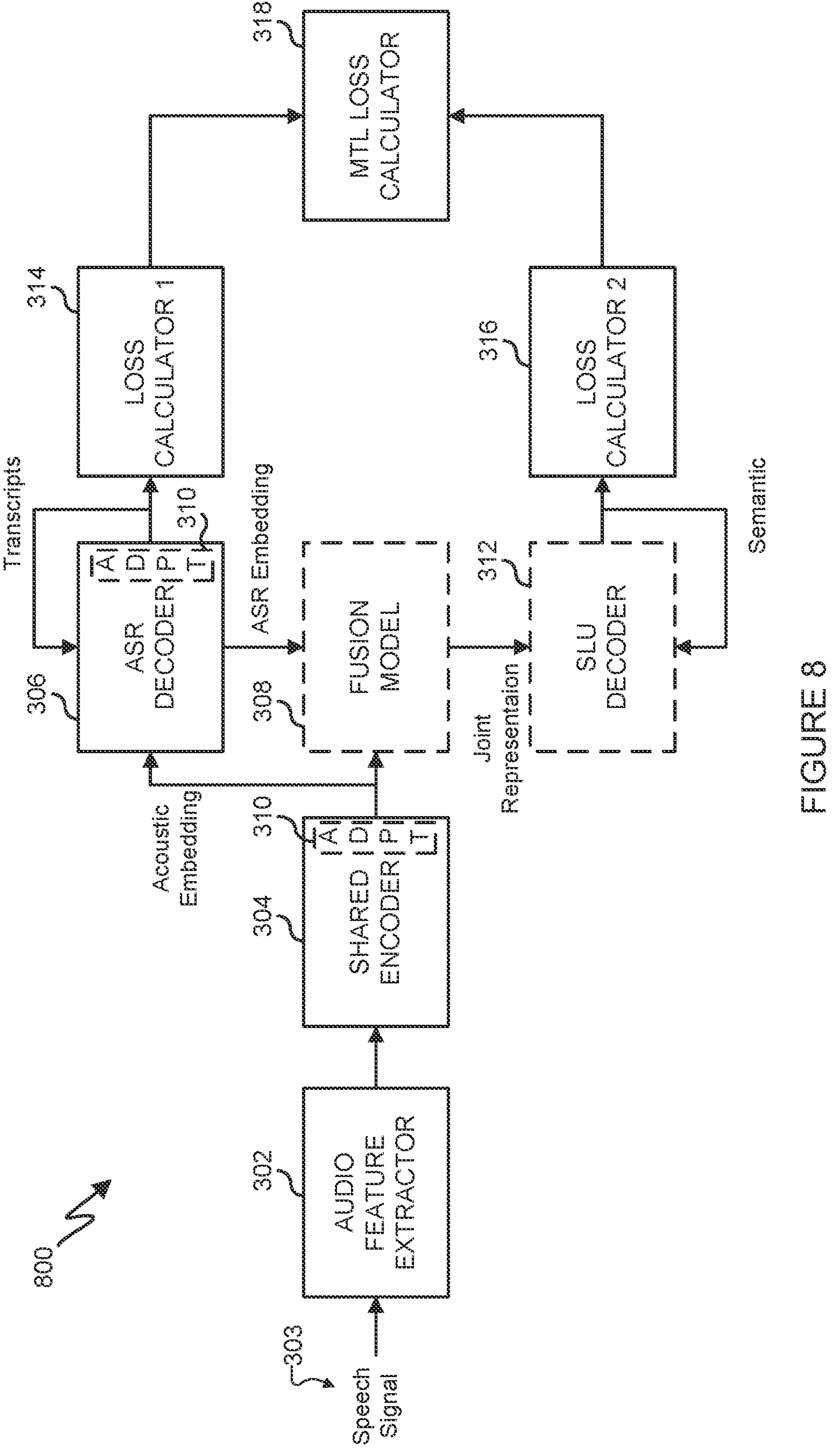

FIGS. 6 through 8 illustrate example ASR-based SLU model training processes 600, 700, 800, respectively, in accordance with this disclosure. For case of explanation, the processes 600, 700, 800 may be described as involving the use of the electronic device 101 in the network configuration 100 of FIG. 1. However, each of the processes 600, 700, 800 may be used with any other suitable device (such as the server 106) or a combination of devices (such as the electronic device 101 and the server 106) and in any other suitable system(s).

FIGS. 6 through 8 demonstrate that the ASR-based SLU model of this disclosure can be trained in a variety of ways depending on particular environment parameters, domains, use cases, or other characteristics. Components in FIG. 6 through 8 with dashed lines represent components that are being trained. For example, in FIG. 6, the training process

600 involves a full update process in which all of the shared encoder 304, the ASR decoder 306, the fusion model 308, and the SLU decoder 312 are updated during the training process 600 using multi-task learning as described in this disclosure. It can be advantageous is certain scenarios to update all components with respect to automated speech recognition, intent classification, and slot filling performance, especially in cases where numerous parameters can be updated with a sufficient amount of training data.

As shown in FIG. 7, in other embodiments, the process 700 includes training the fusion model 308 and the SLU decoder 312, while other components such as the shared encoder 304 and the ASR decoder 306 remain static. The process 700 provides for more efficient training but comes at the cost of potentially missing the opportunity to also improve the ASR models.

As shown in FIG. 8, in still other embodiments, the process 800 includes training the fusion model 308, the SLU decoder 312, and the adapters 310 of the shared encoder 304 and the ASR decoder 306 using multi-task training, while the other parameters of the shared encoder 304 and the ASR decoder 306 remain static. As described in this disclosure, the adapters 310 can be inserted into the shared encoder 304 and the ASR decoder 306 as small models, such as small models inserted between transformer layers. In various embodiments, each of the adapters 310 can use a down-projection layer to project an input to a lower-dimensional space specified by a bottleneck dimension, followed by a rectified linear units (ReLU) activation function and an up-projection layer. The adapters 310 can be surrounded by a residual connection. Fine-tuning the full ASR encoder and decoder models can be resource-inefficient and time-consuming. Training just the adapters 310, however, allows for an increase in training efficiency while providing for accurate training performance comparable to the full update training method of the process 600 of FIG. 6.

Although FIGS. 6 through 8 example ASR-based SLU model training processes, various changes may be made to FIGS. 6 through 8. For example, various components and functions in FIGS. 6 through 8 may be combined, further subdivided, replicated, or rearranged according to particular needs. Also, one or more additional components and functions may be included if needed or desired. In addition, while shown as involving a series of steps, various steps in FIGS. 6 through 8 could overlap, occur in parallel, occur in a different order, or occur any number of times (including zero times).

Figure 9:
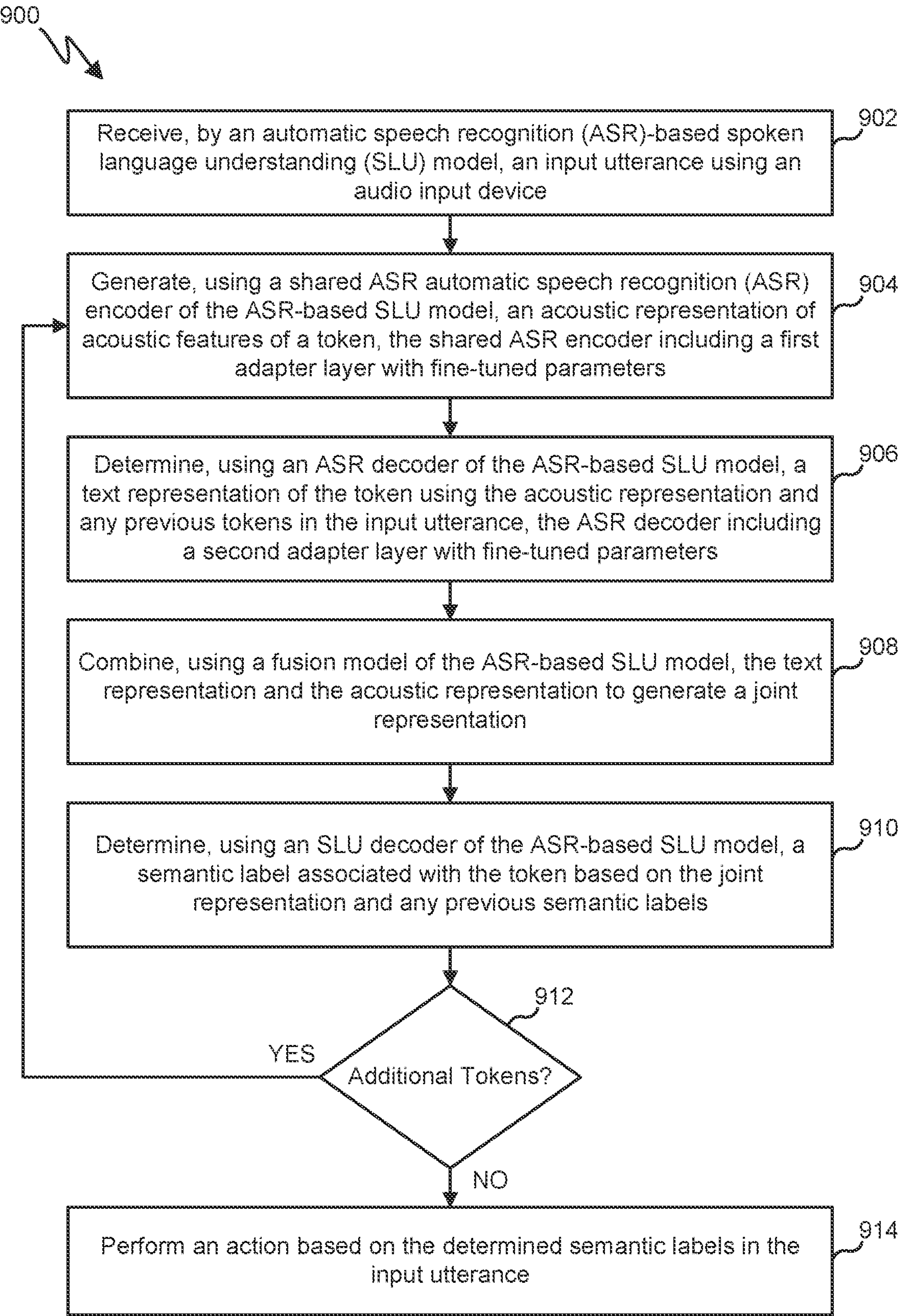
FIG. 9 illustrates an example method for ASR-based SLU in accordance with this disclosure.

FIG. 9 illustrates an example method 900 for ASR-based spoken language understanding in accordance with this disclosure. For ease of explanation, the method 900 shown in FIG. 9 is described as being performed using the electronic device 101 in the network configuration 100 of FIG. 1. However, the method 900 could be performed using any other suitable device (such as the server 106) or a combination of devices (such as the electronic device 101 and the server 106) and in any other suitable system(s).

At step 902, an input utterance from an audio input device is received by an ASR-based SLU model. This can include the processor 120 receiving the audio input via the audio input device 206 and passing the audio input to the ASR-based SLU model 202. In some embodiments, as described in this disclosure, the ASR-based SLU model may be trained using multi-task learning, which may include using two negative log likelihood loss functions for training for both ASR output and semantic information. At step 904, an acoustic representation of acoustic features of a token is generated using a shared ASR encoder of the ASR-based SLU model. The shared ASR encoder can include a first adapter layer, such as adapter model 310, with fine-tuned parameters. This can include the processor 120 executing the shared encoder 304, including the layers 404-408 and the adapter layer 310 of the shared encoder 304. At step 906, a text representation of the token is determined using an ASR decoder of the ASR-based SLU model using the acoustic representation and any previous tokens in the input utterance. The ASR decoder can include a second adapter layer, such as the adapter model 310, with fine-tuned parameters. This can include the processor 120 executing the ASR decoder 306, including the layers 410-414 and the adapter layer 310 of the ASR decoder 306. In some embodiments, each of the first and second adapter layers includes a down-projection layer configured to project an input token to a lower-dimensional space, an activation function, and an up-projection layer. The ASR-based SLU model can also include one or more additional neural network modules, such as at least one of a convolutional neural network, a feedforward neural network, or another neural network architecture. Also, in some embodiments, the fine-tuned parameters of each of the first and second adapter layers in the ASR-based SLU model are fine-tuned with weights of an SLU decoder.

At step 908, the text representation and the acoustic representation are combined, using a fusion model of the ASR-based SLU model, to generate a joint representation. This can include the processor 120 executing the fusion model 308, including layers 418, 420 of the fusion model 308. In some embodiments, to combine the text representation and the acoustic representation to generate the joint representation, the processor 120 can generate an output by the fusion model using (i) the acoustic representation as a query and the text representation as a key and value or (ii) the text representation as the query and the acoustic representation as the key and value. The output can be fed to a linear layer to obtain the joint representation. At step 910, a semantic label associated with the token is determined using an SLU decoder of the ASR-based SLU model and based on the joint representation and any previous semantic labels. This can include the processor 120 executing the SLU decoder 312, including layers 422-428 of the SLU decoder 312. In some embodiments, the shared ASR encoder and the ASR decoder can be trained via domain-specific audio-text pair data, and the shared ASR encoder, the ASR decoder, and the SLU model can be jointly trained using domain-specific audio-text and semantic pair data and the two negative log likelihood loss functions. To train the ASR-based SLU model, the fusion model and the SLU decoder may be updated, while the shared ASR encoder and the ASR decoder may remain unchanged. To train the ASR-based SLU model, the fusion model, the SLU decoder, and the first and second adapter layers may be updated, while other components of the shared ASR encoder and the ASR decoder may remain unchanged.

At step 912, it is determined whether any additional utterance tokens are to be processed by the method 900. For example, the input utterance can include multiple tokens, and steps 904-908 can be performed for each token of the input utterance. If, at step 912, it is determined there are additional tokens to be processed, the method 900 moves to step 904. If, at step 912, it is determined there are no additional tokens to be processed, the method 900 moves to step 914. At step 914, an action based on the determined semantic labels in the input utterance is performed. This can include the processor 120 causing the electronic device 101 to carry out a task or action indicated in the audio input.

Although FIG. 9 illustrates one example of a method 900 for ASR-based spoken language understanding, various changes may be made to FIG. 9. For example, while shown as a series of steps, various steps in FIG. 9 could overlap, occur in parallel, occur in a different order, or occur any number of times (including zero times).

It should be noted that the functions shown in FIGS. 2 through 9 or described above can be implemented in an electronic device 101, 102, 104, server 106, or other device(s) in any suitable manner. For example, in some embodiments, at least some of the functions shown in FIGS. 2 through 9 or described above can be implemented or supported using one or more software applications or other software instructions that are executed by the processor 120 of the electronic device 101, 102, 104, server 106, or other device(s). In other embodiments, at least some of the functions shown in FIGS. 2 through 9 or described above can be implemented or supported using dedicated hardware components. In general, the functions shown in FIGS. 2 through 9 or described above can be performed using any suitable hardware or any suitable combination of hardware and software/firmware instructions. Also, the functions shown in FIGS. 2 through 9 or described above can be performed by a single device or by multiple devices. For instance, the server 106 might be used to train the machine learning model 202, and the server 106 could deploy the trained machine learning model 202 to one or more other devices (such as the electronic device 101) for use.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:

receiving, by an automatic speech recognition (ASR)-based spoken language understanding (SLU) model, an input utterance using an audio input device;

for each token of the input utterance:

generating, using a shared ASR encoder of the ASR-based SLU model, an acoustic representation of acoustic features of the token, wherein the shared ASR encoder includes a first adapter layer with fine-tuned parameters;

determining, using an ASR decoder of the ASR-based SLU model, a text representation of the token using the acoustic representation and any previous tokens in the input utterance, wherein the ASR decoder includes a second adapter layer with fine-tuned parameters;

combining, using a fusion model of the ASR-based SLU model, the text representation and the acoustic representation to generate a joint representation, wherein the joint representation increases performance of an SLU decoder of the ASR-based SLU model, and wherein combining the text representation and the acoustic representation to generate the joint representation comprises generating an output by the fusion model by one of:

using the acoustic representation as a query and the text representation as a key and value; or using the text representation as the query and the acoustic representation as the key and value; and determining, using the SLU decoder of the ASR-based SLU model, a semantic label associated with the token based on the joint representation and any previous semantic labels; and performing an action based on the determined semantic labels in the input utterance.

2. The method of claim 1, wherein:

the first and second adapter layers each comprises a down-projection layer that projects an input token to a lower-dimensional space, an activation function, and an up-projection layer; and the ASR-based SLU model includes one or more additional neural network modules including at least one of: a convolutional neural network, a feedforward neural network, or another neural network architecture.

3. The method of claim 1, wherein the fine-tuned parameters of each of the first and second adapter layers in the ASR-based SLU model are fine-tuned with weights of the SLU decoder.

4. The method of claim 1, wherein the ASR-based SLU model is trained using multi-task learning including two negative log likelihood loss functions used for training for an ASR output and training for semantic information.

5. The method of claim 4, wherein:

the shared ASR encoder and the ASR decoder are trained via domain-specific audio-text pair data; and the shared ASR encoder, the ASR decoder, and the SLU model are jointly trained using domain-specific audio-text and semantic pair data and the two negative log likelihood loss functions.

6. The method of claim 1, wherein, to train the ASR-based SLU model, the fusion model and the SLU decoder are updated while the shared ASR encoder and the ASR decoder remain unchanged.

7. The method of claim 1, wherein, to train the ASR-based SLU model, the fusion model, the SLU decoder, and the first and second adapter layers are updated while other components of the shared ASR encoder and the ASR decoder remain unchanged.

8. The method of claim 1, wherein combining the text representation and the acoustic representation to generate the joint representation comprises:

feeding the output to a linear layer to obtain the joint representation.

9. An electronic device comprising:

at least one processing device configured to:

receive, by an automatic speech recognition (ASR)-based spoken language understanding (SLU) model, an input utterance using an audio input device;

for each token of the input utterance:

generate, using a shared ASR encoder of the ASR-based SLU model, an acoustic representation of acoustic features of the token, wherein the shared ASR encoder includes a first adapter layer with fine-tuned parameters;

determine, using an ASR decoder of the ASR-based SLU model, a text representation of the token using the acoustic representation and any previous tokens in the input utterance, wherein the ASR decoder includes a second adapter layer with fine-tuned parameters;

combine, using a fusion model of the ASR-based SLU model, the text representation and the acoustic representation to generate a joint representation, wherein the joint representation increases performance of an SLU decoder of the ASR-based SLU model, and wherein, to combine the text representation and the acoustic representation to generate the joint representation, the at least one processing device is configured to:

generate an output by the fusion model by one of:

using of the acoustic representation as a query and the text representation as a key and value; or using of the text representation as the query and the acoustic representation as the key and value; and determine, using the SLU decoder of the ASR-based SLU model, a semantic label associated with the token based on the joint representation and any previous semantic labels; and perform an action based on the determined semantic labels in the input utterance.

10. The electronic device of claim 9, wherein:

the first and second adapter layers each comprises a down-projection layer configured to project an input token to a lower-dimensional space, an activation function, and an up-projection layer; and the ASR-based SLU model includes one or more additional neural network modules including at least one of: a convolutional neural network, a feedforward neural network, or another neural network architecture.

11. The electronic device of claim 9, wherein the fine-tuned parameters of each of the first and second adapter layers in the ASR-based SLU model are fine-tuned with weights of the SLU decoder.

12. The electronic device of claim 9, wherein the ASR-based SLU model is trained using multi-task learning including two negative log likelihood loss functions used for training for an ASR output and training for semantic information.

13. The electronic device of claim 12, wherein:

the shared ASR encoder and the ASR decoder are trained via domain-specific audio-text pair data; and the shared ASR encoder, the ASR decoder, and the SLU model are jointly trained using domain-specific audio-text and semantic pair data and the two negative log likelihood loss functions.

14. The electronic device of claim 9, wherein, to train the ASR-based SLU model, the fusion model and the SLU decoder are updated while the shared ASR encoder and the ASR decoder remain unchanged.

15. The electronic device of claim 9, wherein, to train the ASR-based SLU model, the fusion model, the SLU decoder, and the first and second adapter layers are updated while other components of the shared ASR encoder and the ASR decoder remain unchanged.

16. The electronic device of claim 9, wherein, to combine the text representation and the acoustic representation to generate the joint representation, the at least one processing device is configured to:

feed the output to a linear layer to obtain the joint representation.

17. A non-transitory machine readable medium containing instructions that when executed cause at least one processor of an electronic device to:

receive, by an automatic speech recognition (ASR)-based spoken language understanding (SLU) model, an input utterance using an audio input device;

for each token of the input utterance:

generate, using a shared ASR encoder of the ASR-based SLU model, an acoustic representation of acoustic features of the token, wherein the shared ASR encoder includes a first adapter layer with fine-tuned parameters;

determine, using an ASR decoder of the ASR-based SLU model, a text representation of the token using the acoustic representation and any previous tokens in the input utterance, wherein the ASR decoder includes a second adapter layer with fine-tuned parameters;

combine, using a fusion model of the ASR-based SLU model, the text representation and the acoustic representation to generate a joint representation, wherein the instructions that when executed cause the at least one processor to combine the text representation and the acoustic representation to generate the joint representation include:

instructions that when executed cause the at least one processor to generate an output by the fusion model by one of:

using of the acoustic representation as a query and the text representation as a key and value; or using of the text representation as the query and the acoustic representation as the key and value; and determine, using an SLU decoder of the ASR-based SLU model, a semantic label associated with the token based on the joint representation and any previous semantic labels; and perform an action based on the determined semantic labels in the input utterance.

18. The non-transitory machine readable medium of claim 17, wherein:

the first and second adapter layers each comprises a down-projection layer configured to project an input token to a lower-dimensional space, an activation function, and an up-projection layer; and the ASR-based SLU model includes one or more additional neural network modules including at least one of a convolutional neural network, a feedforward neural network, or another neural network architecture.

19. The non-transitory machine readable medium of claim 17, wherein the ASR-based SLU model is trained using multi-task learning including two negative log likelihood loss functions used for training for an ASR output and training for semantic information.

20. The non-transitory machine readable medium of claim 17, wherein the instructions that when executed cause the at least one processor to combine the text representation and the acoustic representation to generate the joint representation include:

instructions that when executed cause the at least one processor to feed the output to a linear layer to obtain the joint representation.

* * * * *